(12) United States Patent
Le Clinche (10) Patent No.: US 6,511,100 B1
(45) Date of Patent: Jan. 28, 2003

(54) BALL-BEARING COUPLER (75) Inventor: Pascal Le Clinche, Rennes (FR)

(73) Assignee: Legris SA, Rennes (FR)

( * ) Notice: Subject to any disclaimer, the term of this patent is extended or adjusted under 35 U.S.C. 154(b) by 0 days.

(21) Appl. No.: 09/857,309

(22) PCT Filed: Nov. 25, 1999

(86) PCT No.: PCT/FR99/02907

§ 371 (c)(1),
(2), (4) Date: Jun. 1, 2001

(87) PCT Pub. No.: WO00/32977

PCT Pub. Date: Jun. 8, 2000

(30) Foreign Application Priority Data

Dec. 2, 1998 (FR) .............................. 98 15217
Jan. 18, 1999 (FR) .............................. 99 00445

(51) Int. Cl.$^7$ ................................. F16L 37/18
(52) U.S. Cl. ................ 285/316; 285/314; 403/322.2
(58) Field of Search .................. 285/314, 316; 403/322.2, DIG. 6, 321, 322.1, 322.3, 325, 365, 366

(56) References Cited

U.S. PATENT DOCUMENTS

| 1,879,364 A | | 9/1932 | Louis | |
|---|---|---|---|---|
| 2,377,812 A | * | 6/1945 | Scheiwer | 285/169 |
| 2,470,256 A | * | 5/1949 | McIlroy | 285/168 |
| 2,744,770 A | * | 5/1956 | Davidson et al. | 285/169 |
| 3,083,042 A | * | 3/1963 | Collar | 285/93 |
| 4,198,080 A | * | 4/1980 | Carpenter | 24/635 |
| 4,775,269 A | * | 10/1988 | Brix | 279/78 |
| 5,445,358 A | * | 8/1995 | Anderson | 251/149.6 |
| 5,607,139 A | * | 3/1997 | Kjellberg | 251/149.1 |
| 6,062,606 A | * | 5/2000 | Carpini et al. | 285/316 |
| 6,131,961 A | * | 10/2000 | Heilmann | 285/314 |

FOREIGN PATENT DOCUMENTS

| DE | B1212797 | 6/1957 |
|---|---|---|
| GB | A2021722 | 12/1979 |

* cited by examiner

Primary Examiner—Lynne H. Browne
Assistant Examiner—Ryan M. Flandro
(74) Attorney, Agent, or Firm—Birch, Stewart, Kolasch & Birch, LLP (57) ABSTRACT A ball coupling comprising a male tubular endpiece (2) provided with an outer annular collar (4), a female tubular endpiece (3) having a ball-retaining cage fixed axially thereon, the cage having slots (10) for receiving balls (12), and a thimble (13) disposed coaxially about the cage (6) and mounted thereon via guide means (14, 15) for guiding the thimble to turn about the longitudinal axis (1) of the coupling so as to enable the thimble to turn through a turn angle (α) relative to the cage between a first position and a second position, the is thimble having for each ball, a first recess (16) extending in register with the corresponding slot for the first position of the thimble to form an abutment for holding the corresponding ball in a position in which it projects into the inside of the cage, and a second recess (17) connected to the first recess via a sloping wall (18) and offset relative to the first recess by an angle corresponding to the turn angle (α) so as to receive the corresponding ball in a position in which it is retracted from its projecting position when the thimble is in its second position.

7 Claims, 8 Drawing Sheets

FIG_9

FIG_10

FIG_11

FIG_12

FIG_13

FIG_14

FIG_15

FIG_16

FIG_17

FIG_18

BALL-BEARING COUPLER

This application is the national phase under 35 U.S.C. § 371 of PCT International Application No. PCT/FR99/02907 which has an International filing date of Nov. 25, 1999, which designated the United States of America.

The present invention relates to a ball coupling suitable for use in particular in circuits for conveying pressurized fluid for the purpose of providing a quick coupling between two elements of the circuit such as a pipe and a member for delivering or receiving fluid, or such as two pipes.

Ball couplings are known which comprises a male tubular endpiece having an outer annular collar, and a female tubular endpiece for receiving the male tubular endpiece, the endpieces being designed to be associated with respective circuit elements. The male endpiece is held in the female endpiece by locking means pressing balls into abutments behind the annular collar.

In general, the locking means comprise a ball-holding cage mounted on one end of the female endpiece so as to extend it axially, and a thimble mounted on the ball-holding cage so as to be capable of moving axially between a first position and a second position. The thimble has internal camming surfaces that are axially offset relative to one another and that are organized in such a manner that when the thimble is in its first position, the balls are held so as to project into the inside of the cage, thereby retaining the annular collar on the male endpiece, and so that when the thimble is in its second position, the balls are released radially, thereby enabling them to co-operate with the annular collar so as to be moved from the projecting position to a retracted position, thereby enabling the male endpiece to be withdrawn.

Such ball couplings are in widespread use in industry because they make it possible to achieve coupling quickly. In addition, coupling is simple to perform and can be implemented by unspecialized labor. However, when a traction force is applied on one of the coupled-together elements, there is a risk of the thimble coming into abutment against some other element located close to the coupling, and thus a risk of it being moved axially relative to the ball-retaining cage. If the circuit is under pressure, such displacement can lead to the pipe becoming suddenly disconnected which is equivalent to the pipe rupturing, and in addition this can happen with a "whiplash" effect that increases with increasing pressure of the fluid in the circuit.

There thus exists a need, that has not been satisfied in convenient manner until now for a ball coupling that limits the risk of a coupled pipe being disconnected accidentally.

To this end, the invention provides a ball coupling having a longitudinal axis and comprising a male tubular endpiece provided with an outer annular collar, a female tubular endpiece on which one end of a tubular sleeve is fixed coaxially, the sleeve extending beyond the female endpiece and having slots to form a cage for retaining balls for locking the male endpiece in a coupled state in the female endpiece, and a thimble that is coaxial about the sleeve and that is mounted thereon via guide means enabling the thimble to be guided so as to turn about the longitudinal axis of the coupling and enabling the thimble to turn through a turn angle relative to the sleeve between a first position and a second position, the cage having internal means for receiving locking balls in a connected state, said means presenting, for each ball, a first recess extending in register with the corresponding slot when the thimble is in its first position so as to form an abutment for holding the corresponding ball in a position where it projects into the inside of the sleeve so as to define a passage of section smaller than that of the outer annular collar, and a second recess connected to the first recess via a sloping wall and offset from the first recess by an angle corresponding to the turn angle so as to receive the corresponding ball in a retracted position that is retracted relative to its projecting position so as to define a passage of section that is not less than the section of the outer annular collar, when the thimble is in its second position.

Thus, the coupling is unlocked by causing the thimble to turn relative to the sleeve. The risk of that movement occurring for accidental reasons is small. The probability of the coupling becoming unlocked accidentally is therefore reduced.

In a particular embodiment, the slots are elongate and extend parallel to the longitudinal axis of the coupling, each first recess extending in register with a portion of a slot that is adjacent to the free end of the sleeve.

In an advantageous variant, a valve member is mounted in the female endpiece to move between a closed position for closing the female endpiece, into which position it is urged resiliently, and an open position into which it is moved by the male endpiece when it is in a position inside the female endpiece corresponding to the coupled state; the sleeve has slots for forming a cage for holding retaining balls for retaining the male endpiece in a disengaged position relative to the female endpiece, the retaining balls extending relative to the locking balls in a position that is offset axially towards the free end of the sleeve, the thimble being mounted on the sleeve so as to be movable into a third position and having internal means for receiving the retaining balls such that the retaining balls are in a position in which they project into the inside of the sleeve so as to define a passage of section smaller than that of the outer annular collar, at least when the thimble is in its second position, and such that the retaining balls are in a retracted position that is retracted relative to their projecting position so as to define a passage of section that is not less than the section of the annular collar when the thimble is in its third position, and the coupling has means for putting the male endpiece when in the disengaged position into connection with an exhaust.

Thus, prior to disconnection, the circuit associated with the male endpiece can be purged by bringing the male endpiece into the disengaged position. The risk of a disconnection being associated with a "whiplash" effect is thus very low.

Advantageously, the thimble has an additional annular recess connected via a sloping wall to the first recesses so as to extend in register with portions of the slots extending close to the fixed end of the sleeve for receiving the balls in the retracted position, the ring being slidably mounted in the additional recess so as to slide between a position for disengaging the additional recess and a position for obstructing the additional recess, into which position the ring is urged resiliently to push the balls into the first recesses.

Thus, the male endpiece is coupled merely by being inserted into the sleeve until the balls pushed away by the annular collar are retracted into the additional annular recess and, after the annular collar has gone past, return into the first recesses and thus into the projecting position under drive from the resilient return of the ring into its obstruction position. The coupling operation can thus be performed quickly and is particularly simple.

Other characteristics and advantages of the invention will appear on reading the following description of particular, non-limiting embodiments of the invention.

Reference is made to the accompanying drawings, in which.

The ball coupling of the invention is designed to enable two elements of a pressurized fluid circuit to be coupled together quickly.

With reference to FIGS. 1 to 8, the ball coupling constituting the first embodiment of the invention comprises, about a longitudinal axis 1: a male tubular endpiece given overall reference 2; and a female tubular endpiece given overall reference 3. The male tubular endpiece has an outer annular collar 4 with converging side walls 4.1 and 4.2. The male endpiece 2 is designed to be mounted on a pipe and to be inserted in the female endpiece 3. The female endpiece 3 has an O-ring 5 for ensuring that its coupling with the male endpiece 2 is leakproof. The female endpiece 3 is designed to be mounted on a member that is to be fed with fluid under pressure, or else on another pipe.

Figure 1:
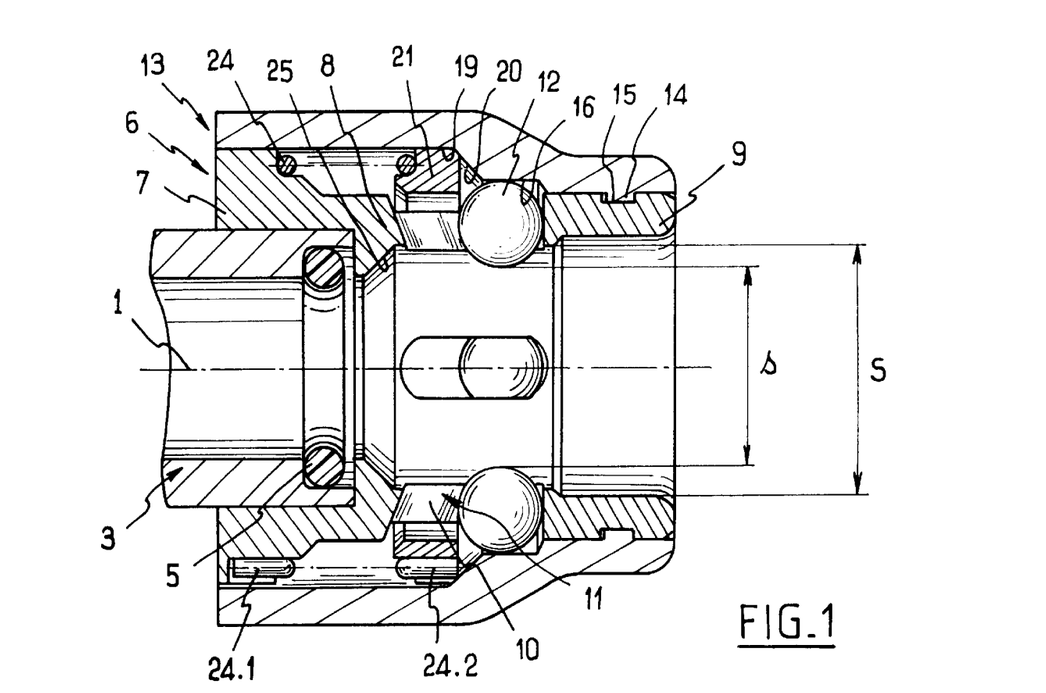
FIG. 1 is a longitudinal section view of a ball coupling in a first embodiment of the invention.

The ball coupling also comprises a sleeve given overall reference 6, having one of its ends 7 mounted on the female endpiece 3 so as to extend coaxially thereabout. The sleeve 6 has a portion 8 of circular internal section S, greater than the section s' of the annular collar 4, extending beyond the female endpiece 3, and terminating in a free end 9 opposite to the end 7. The portion 8 of the sleeve 6 has elongate slots 10 extending parallel to the longitudinal axis 1 and at 90° to one another. The slots 10 are defined by edges 11 which converge towards each other going towards the inside of the sleeve.

Balls 12 are received in the slots and are of a diameter greater than the transverse dimension of the smaller opening defined by the edges 11 so that the balls 12 cannot penetrate into the inside of the sleeve 6. The sleeve 6 thus forms a ball-holding cage for holding the balls 12 in the coupling.

A thimble 13 is mounted to pivot on the sleeve 6 via two ring-shaped portions 14 projecting inside the thimble 13 to be received in two groove portions 15 formed in the outside of the sleeve 6. The respective dimensions of the ring portions 14 and of the groove portions 15 are determined in such a manner as to enable the thimble 13 to turn through an angle α relative to the sleeve 6, where the angle α is equal to about 35° in this case. First and second extreme angular positions of the thimble 13 relative to the sleeve 6 are thus defined. Naturally, provision could have been made for the ball-holding cage to have some number of slots other than four for receiving a corresponding number of balls. The turn angle α would then need to be modified to correspond to the angular offset between the resulting slots.

The thimble 13 has internal means for receiving the balls 12.

These means comprise first recesses 16 each extending in register with a portion of an adjacent slot 10 at the free end 9 of the sleeve 6 when the thimble 13 is in its first position. The depth of the first recesses 16 is determined in such a manner that the balls 12 received in the first recesses 16 define a passage of section s smaller than the section s' of the annular collar 4.

Second recesses 17 are formed in the thimble 13, they are angularly offset by an angle equal to the angle α relative to the first recesses 16, and they are connected to respective first recesses 16 via respective sloping walls 18. It will be understood that because of the angular offset existing between each first recess 16 and the corresponding second recess 17, each second recess 17 is in register with a corresponding slot 10 when the thimble is in its second position. The depth of the second recesses 17 is determined in such a manner that when the balls 12 are received in the second recesses 17 they define a passage of section not less than the section s' of the annular collar 4.

The means for housing the balls 12 also comprise a third recess 19. The third recess 19 is annular and it is offset axially from the first recess 16 in such a manner as to extend in register with those portions of the slot 10 which themselves lie adjacent to the end 7 of the sleeve 6. The third recess 19 is connected to the first recesses 16 by a conical wall 20. The diameter of the third recess 19 is determined so that the balls received in said third recess 19 define a through section that is not less than the section s' of the annular collar 4.

A ring 21 is mounted to slide in the third recess 19. The ring 21 has two longitudinal splines 22 received in longitudinal grooves 23 in the third recess 19 to prevent any rotation of the ring 21 relative to the thimble 13. The ring 21 is mounted to slide between a position for disengaging the third recess 19 in which the ring 21 releases sufficient space inside the third recess 19 to receive the balls 12, and a position for obstructing the recess 19, into which position the ring 21 is urged resiliently by a spring 24, thereby pushing the balls 12 into the first recesses 16. The spring 24 is a helical spring interposed between the sleeve 16 and the ring 21. The spring 24 has a first end 24.1 secured to the sleeve 6 and an opposite end 24.2 secured to the ring 21. It will be understood that the spring 24 thus operates both in compression to urge the ring 21 towards its obstructing position and in twisting to urge the thimble 13 towards its first position.

Figure 2:
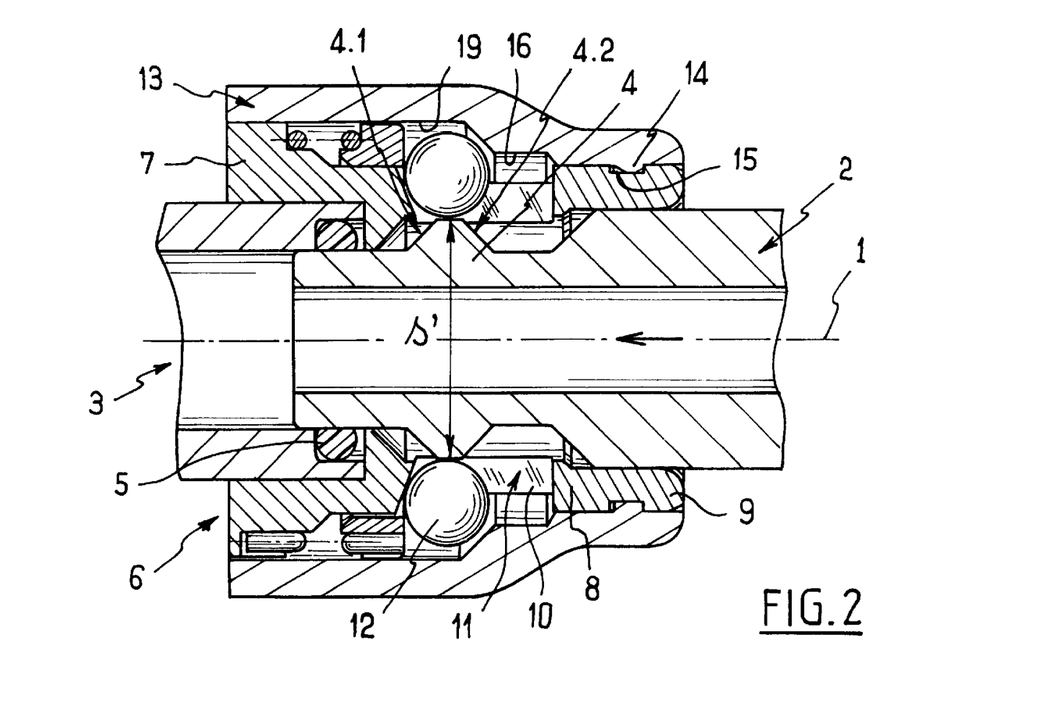
FIG. 2 is a view analogous to FIG. 1 showing the ball coupling at the moment the male endpiece is inserted.
Figure 3:
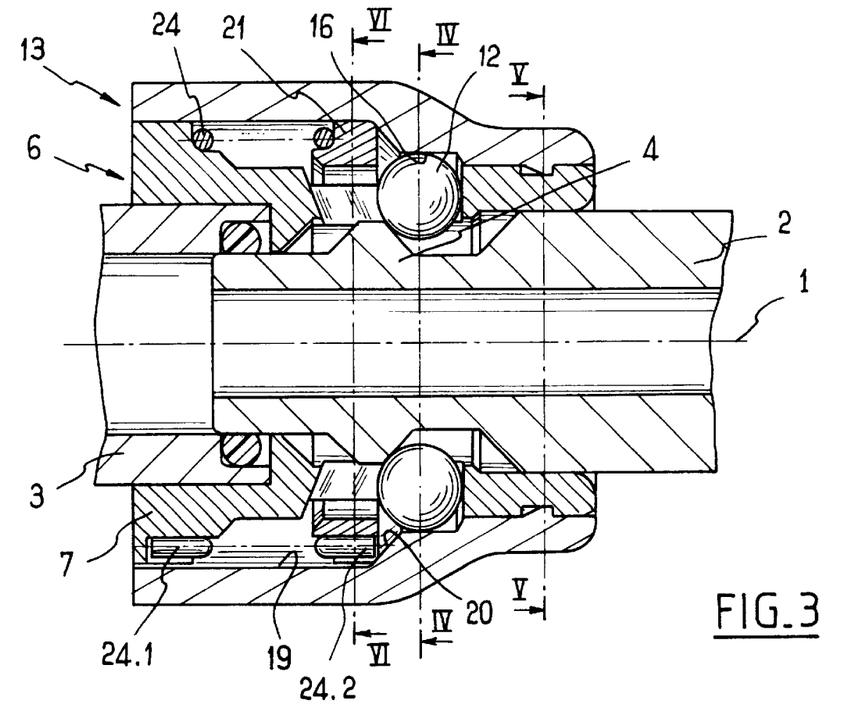
FIG. 3 is a view analogous to FIG. 1 of the ball coupling showing the male endpiece locked in the coupled position.
Figure 4:
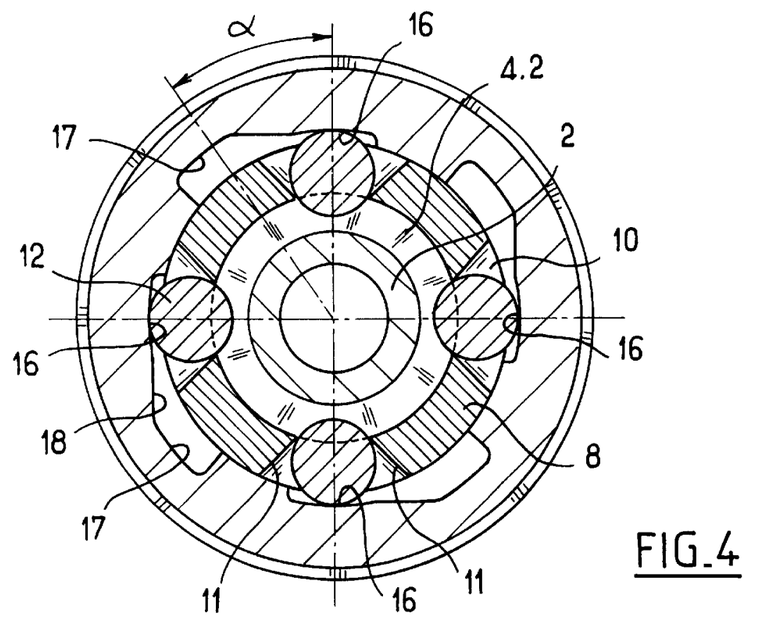
FIGS. 4, 5, and 6 are cross-section views of the ball coupling respectively on lines IV—IV, V—V, and VI—VI of FIG. 3.
Figure 5:
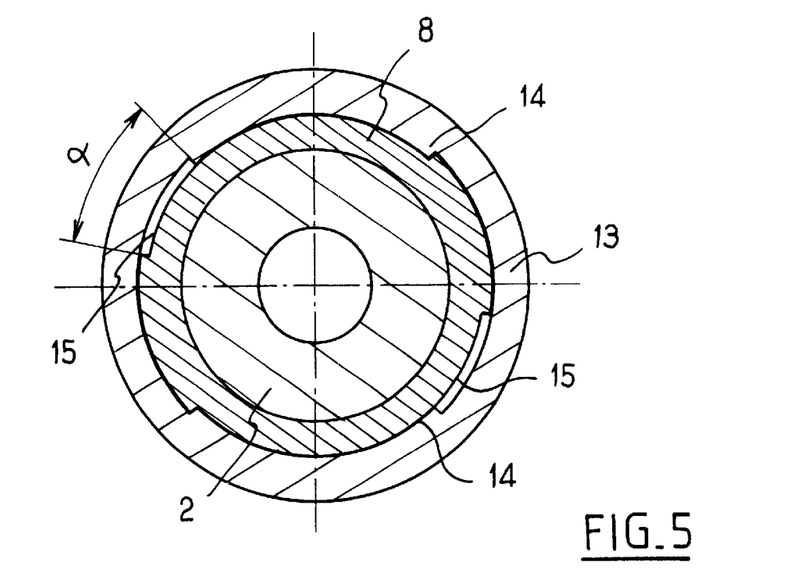
Figure 6:
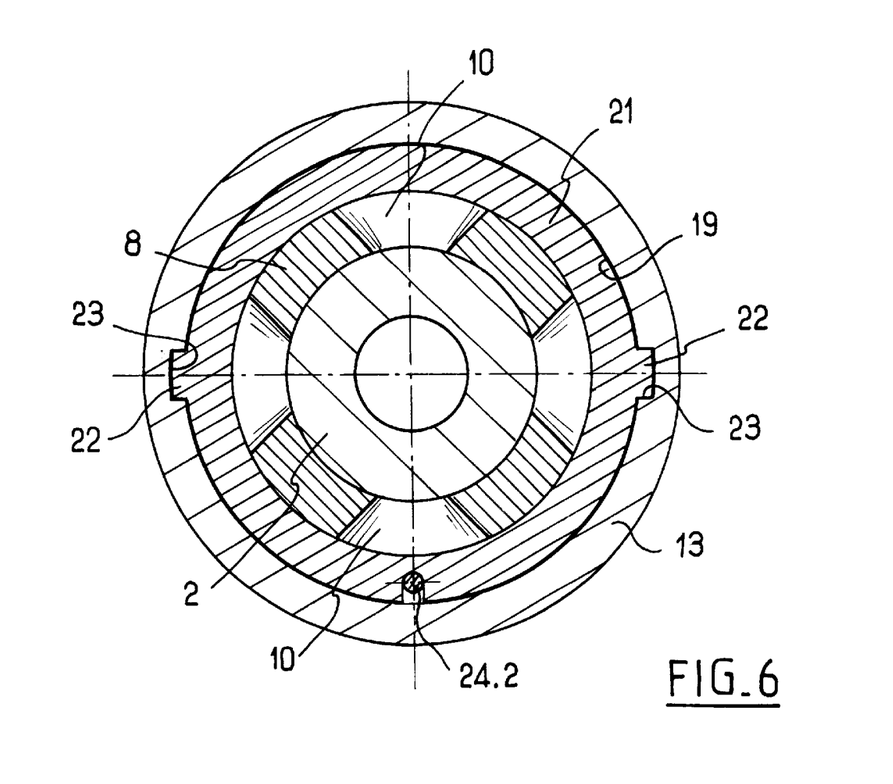

With reference to FIGS. 1 and 2, the thimble 13 is in its first position and the balls 12 are received in the first recesses 16, so the male endpiece 2 can be coupled to the female endpiece 3 by inserting the male endpiece 2 into the sleeve 6. Because of its slope, the surface 4.1 of the annular collar pushes the balls 12 into the third recess 19 so that they take up their retracted positions, with the balls 12 entraining the ring 21 into its disengagement position.

The annular collar 4 can then be inserted beyond the balls so as to come into abutment against a conical shoulder 25 of the sleeve 6 located at the inlet to the female endpiece 3. As this insertion is taking place, the balls 12 are brought into engagement with the wall 4.2 and against the conical wall 20 under drive exerted by the spring 24 as it returns the ring 21 to its obstruction position, thereby causing the balls to take up their projecting positions inside the first recesses 16. Once the ring 21 is in its obstruction position, the balls 12 are in the first recesses 16 and the end wall thereof holds the balls in their projecting positions (see FIGS. 3, 4, 5, and 6).

Figure 7:
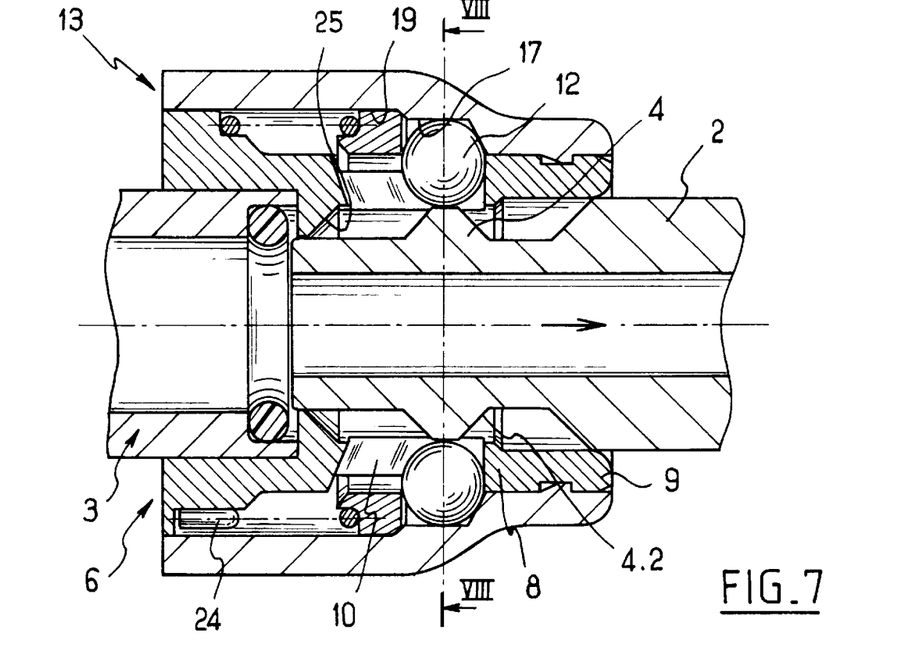
FIG. 7 is a view analogous to FIG. 1 showing the ball coupling while the male endpiece is being withdrawn.
Figure 8:
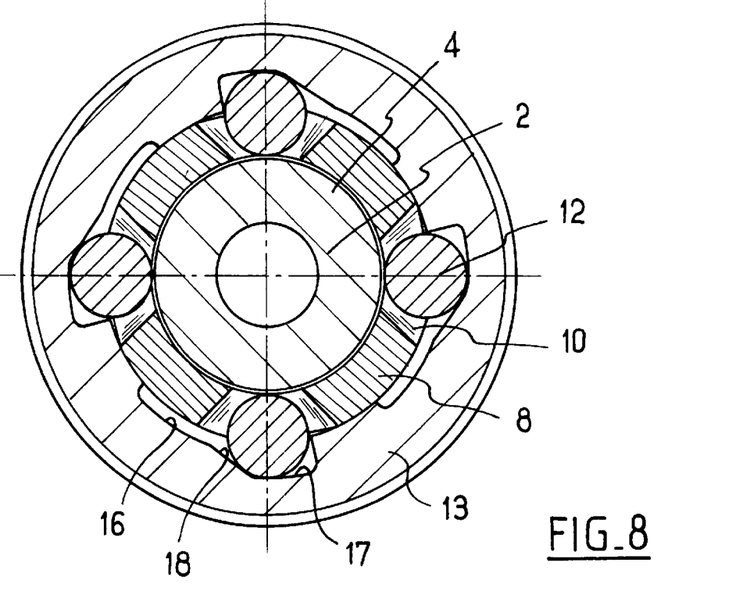
FIG. 8 is a cross-section view of the ball coupling on line VIII—VIII of FIG. 7.

With reference to FIGS. 7 and 8, uncoupling is performed by turning the thimble 13 through the angle α in a clockwise direction (in the figures) so as to bring it into its second position against the return force of the spring 24. The second recesses 17 are then in register with the slots 10. The male endpiece 2 can then be pulled out so that the conical wall 4.2 constitutes a ramp urging the balls 12 into their retracted positions in the second recesses 17. Once the annular collar 4 has moved past, the operator releases the thimble 13 which, under drive from the spring 24, returns to its first position. This brings the balls back into the first recesses 16 under thrust from the sloping walls 18, so that they are again in their projecting positions in which positions they are held by the end walls of the first recesses 16.

The second embodiment of the ball coupling of the invention is described below with reference to FIG. 9 to 18, and elements which are identical or analogous to those described above are given identical reference numbers.

Figure 9:
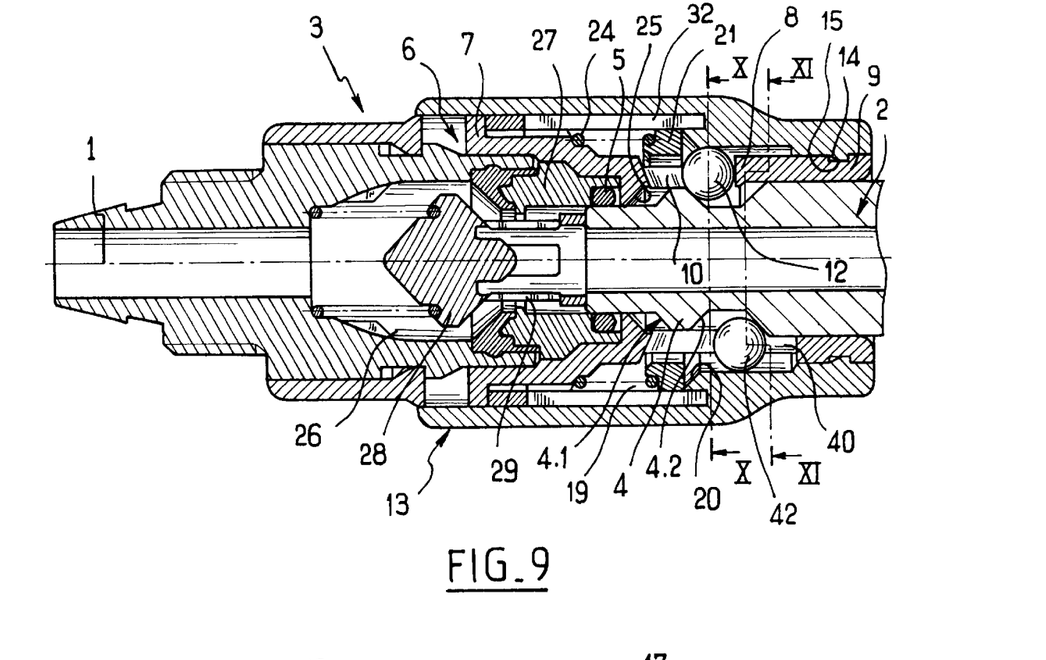
FIG. 9 is a longitudinal section view of a ball coupling constituting a second embodiment of the invention and shown in a connected state.
Figure 10:
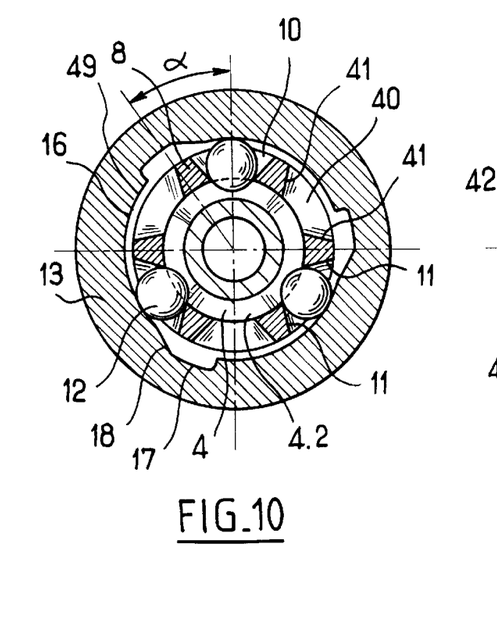
FIGS. 10 and 11 are cross-section views of the FIG. 9 ball coupling respectively on lines X—X and XI—XI.
Figure 11:
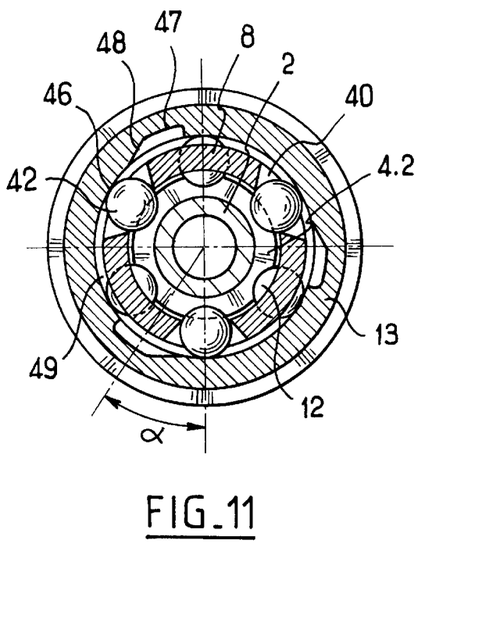

As before, the ball coupling in this embodiment has a longitudinal axis 1, a male tubular endpiece 2, and a female tubular endpiece 3. The male tubular endpiece has an outer annular collar 4 having converging side walls 4.1 and 4.2. The male endpiece 2 is designed to be mounted on a pipe and to be inserted in the female endpiece 3. The female endpiece 3 is associated in this case with a male portion that is designed to be inserted in a pipe.

In this case, the female endpiece 3 is shaped so as to define a recess 26 with a tubular end part 27 forming a seat for a valve member 28 mounted to slide inside the recess 26 between a position in which it closes the female endpiece with the valve member 26 being urged resiliently by a spring against the end part 27, and an open position in which the valve member 28 is spaced apart from the end part 27 and defines an annular flow orifice. The valve member has a tubular perforated tail 29 extending away from the resilient return spring into the end part 27.

As in the first embodiment, the ball coupling has a sleeve 6 with ends 7 and 9 and a portion 8 having elongate slots 10 receiving balls 12. In this case there are three slots 10 extending at 120° intervals from one another.

The thimble 13 is thus mounted to turn on the sleeve 6 via ring portions 14 received in groove portions 15 formed on the outside of the sleeve 6 so as to enable the thimble 13 to turn through an angle α relative to the sleeve 6 on either side of an intermediate position, referred to as a "first" position (shown in FIGS. 10 and 11) into which position the thimble 13 is urged resiliently by means of axially-extending spring blades 32 having their ends respectively secured to the sleeve 6 and to the thimble 13. There are two extreme angular positions defined for the thimble 13 relative to the sleeve 6, these positions being referred to as "second" and "third" positions respectively (shown respectively in FIGS. 13 & 14 and in FIGS. 17 & 18), the positions are on opposite sides of the first position and each of them is angularly offset from the first position by an angle α of about 35°.

As in the first embodiment, the thimble 13 has internal means for receiving the balls 12.

These means comprise an annular recess 49 and recesses 17 formed at 120° intervals from one another in the annular recess 49. Thus, for each ball 12, the chamber 49 defines a first recess 16 between a pair of adjacent recesses 17, and each recess 17 forms a second recess associated with a respective first recess 16. Each first recess 16 is organized to extend in register with the portion of the slot 10 that is situated adjacent to the end 9 of the sleeve 6 when the thimble 13 is in its first position and also when the thimble 13 is in its third position. Each first recess 16 serves to hold the corresponding ball 12 so that it projects into the sleeve 6 when the thimble 13 is in its first and third positions. The second recesses 17 are organized to receive the balls 12 in the retracted position when the thimble 13 is in its second position. Sloping walls 18 connect each first recess 16 to the associated second recess 17.

In this second embodiment, the portion 8 of the sleeve 6 also has three other elongate slots 40 extending parallel to the longitudinal axis 1 at 120° to one another so as to be interleaved between the slots 10. The slots 40 are longer than the slots 10 so as to have a portion extending beyond them towards the end 9 and a portion extending in register with one of the first recesses 16 when the thimble is in its first position. The slots 40 are defined by edges 41 which converge towards each other towards the inside of the sleeve.

Balls 42 are received in the slots 40 in identical manner to the balls 12 in the slots 10.

The thimble 13 has internal means for receiving the balls 42, which means are axially offset towards the end 9 of the sleeve 6 relative to the means for receiving the balls 12.

These means comprise recesses 47 formed in the annular chamber 49 at 120° intervals from one another. For each ball 42, and between each pair of adjacent recesses 47, the annular recess 49 thus defines a first recess 46 disposed to be in register with one of the slots 40, facing the portion of it adjacent to the end 9, so that the corresponding ball 42 is held in the projecting position both when the thimble 13 is in its first position and when it is in its second position.

The recesses 47 form second recesses so that each second recess 47 extends in register with the portion of the corresponding slot 40 adjacent to the end 9 when the thimble 13 is in its third position. The depth of the second recesses 47 is determined so that when the balls 42 are received in the second recesses 47, they are in a retracted position so as to leave a passage of section not less than the section of the annular collar 4. The second recesses 47 are connected to the first recesses 46 via respective sloping walls 48.

The thimble 13 also has internal means for receiving the balls 12 and 42, comprising an additional recess 19 that is annular and offset relative to the annular recess 49 axially towards the end 7 of the sleeve 6 so as to extend in register with portions of the slots 10 and 40 that are adjacent to the shoulder 25. The additional recess 19 is connected to the annular recess 49 via a conical wall 20 to receive the balls 12 and 42 in the retracted position. The additional recess can be obstructed by means of a ring 21 mounted to slide in the additional recess between a disengagement position in which the ring 21 releases sufficient space in the additional recess 19 to receive the balls 12 and 42, and a position in which the additional recess 19 is obstructed by the ring 21 being urged resiliently into it by a spring 24, thereby urging the balls 12 and 42 into the recesses 16.

Coupling is performed in the same manner as in the first embodiment. With the thimble 13 in its first position, the first recesses 16 for housing the balls 12 lie in register with the slots 10 and the slots 40, and the first recesses 46 for receiving the balls 42 lie in register with the slots 40, each first recess 16 communicating in register with a slot 40 with the corresponding first recess 46. When the male endpiece 2 is inserted, the balls 12 and 42 are pushed into the additional recess 19 by the wall 4.1 on the annular collar 4 of the male endpiece, the balls 42 then passing via the first recesses 16 for housing the balls 12. Once the annular collar has gone past, the balls 12 and 42 return to their projecting positions. The balls 12 in abutment against the wall 4.2 of the annular collar 4 and against the ends of the slots 10 adjacent to the end 9 of the sleeve 6 serve to lock the male endpiece 2 in the female endpiece 3 in a position that corresponds to the coupled state. The end of the male endpiece 2 is then pressed against the tail 29 of the valve member 28, is lifting it off its seat so as to allow fluid to flow from the female endpiece 3 towards the male endpiece 2 (see FIGS. 9 to 11), the O-ring 5 in contact around the male endpiece serving to leakproof the coupling.

Figure 12:
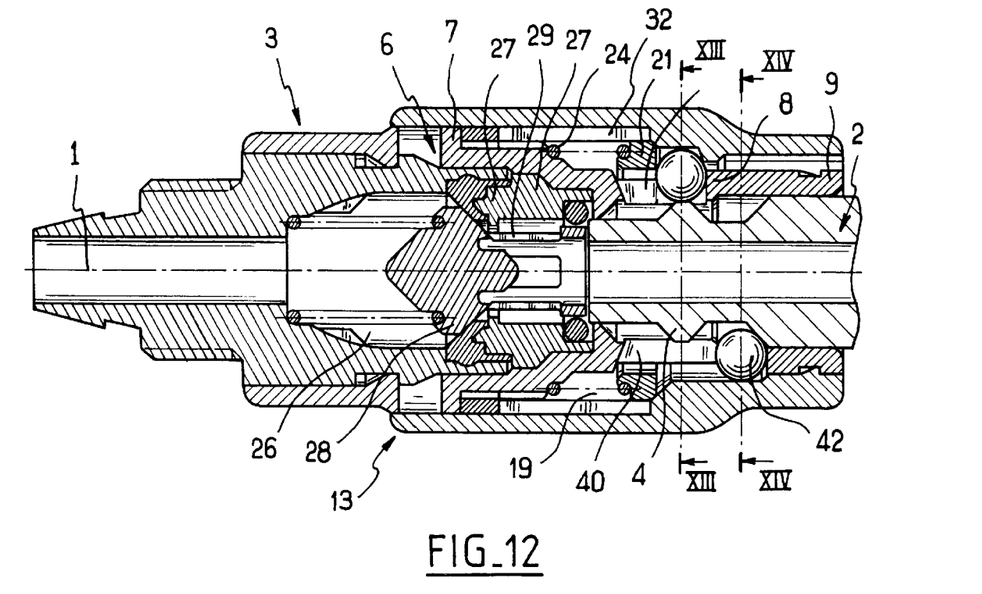
FIG. 12 is a view analogous to FIG. 9 of the second embodiment of the ball coupling while it is being disconnected.
Figure 13:
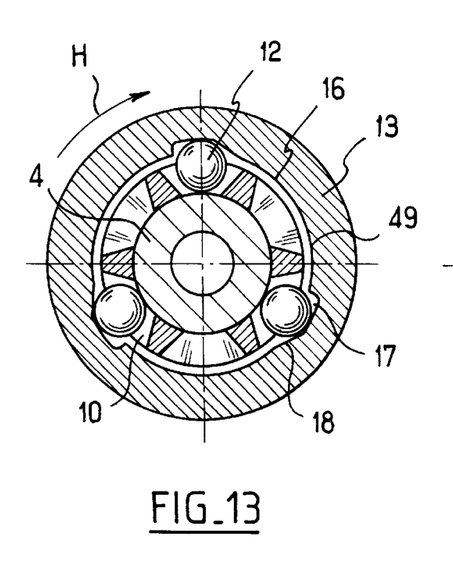
FIGS. 13 and 14 are cross-section views of the ball coupling respectively on lines XIII—XIII and XIV—XIV of FIG. 12.
Figure 14:
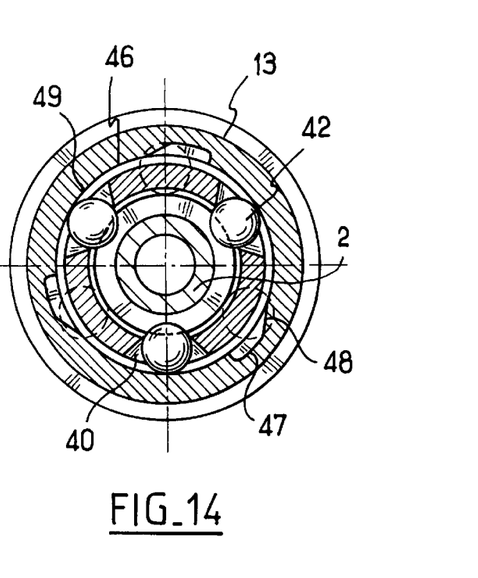
Figure 15:
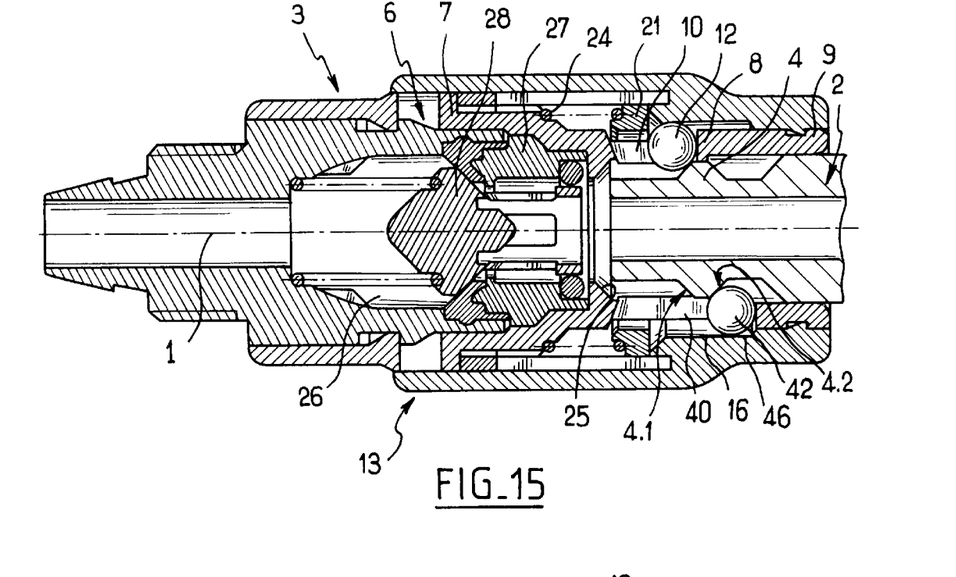
FIG. 15 is a view analogous to FIG. 9 showing the second embodiment of the ball coupling in a purge position.

With reference to FIGS. 12 to 14, uncoupling begins by causing the thimble 13 to turn through the angle α in the clockwise direction (arrow H in FIG. 13) so as to bring it into its second position against the action of the spring blades 32. The second recesses 17 then extend in register with the slots 10 while the first recesses 46 for housing the balls 42 extend in register with the slots 40. Since the balls 12 are no longer held in the projecting position, the male endpiece is pushed backwards under the effect of the pressure of the flowing fluid and of the return spring acting on the valve member so that the conical wall 4.2 constitutes a ramp bringing the balls 12 into their retracted positions within the second recesses 17. The valve member 28 then presses against its seat, thereby closing the pipe. When the conical wall 4.2 comes into contact against the balls 42 it pushes them along the slots 40 until the balls 42 come into abutment against the ends of the slots 40 adjacent to the end 9 of the sleeve 6. The balls 42 thus retain the male endpiece 2 in a position that is axially disengaged from the female endpiece 3 (FIG. 15).

In this position, the male endpiece 2 is no longer in contact with the O-ring 5 so that leakproofing is no longer provided between the female endpiece 3 and the male endpiece 2. The fluid under pressure contained in the pipe connected to the male endpiece 2 can then escape via the recesses 46 and 47 leading to the outside via the end of the thimble 13 adjacent to the end 9 so as to form means for exhausting the male endpiece in its disengaged position. This serves to purge the fluid circuit downstream from the female endpiece.

The thimble 13 is released and returns to its first position under drive from the spring blades 32.

Uncoupling is continued by causing the thimble 13 to pivot through the angle α in an anticlockwise direction (arrow A in FIG. 18) towards its third position against the action of the spring blades 32.

Figure 16:
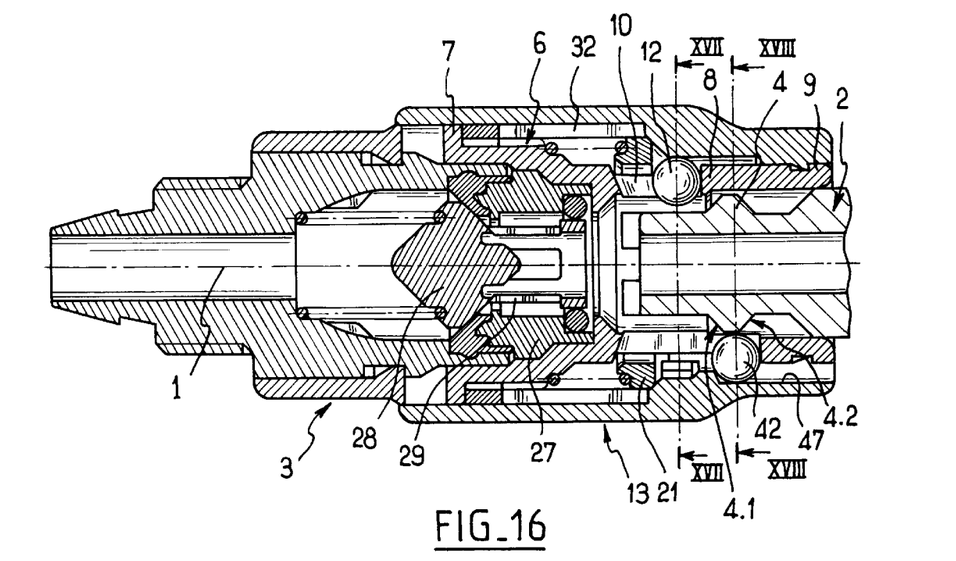
FIG. 16 is a view analogous to FIG. 9 showing the ball coupling at the end of disconnection.
Figure 17:
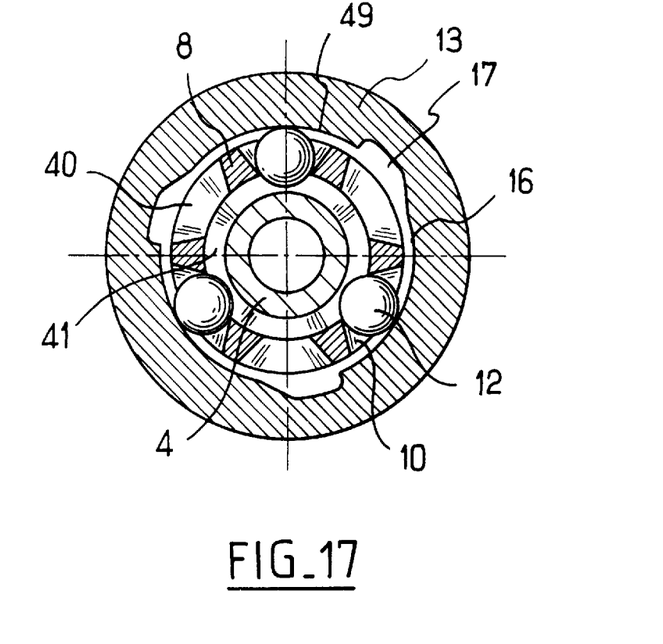
FIGS. 17 and 18 are cross-section views of the ball coupling respectively on lines XVII—XVII and XVIII—XVIII of FIG. 16.
Figure 18:
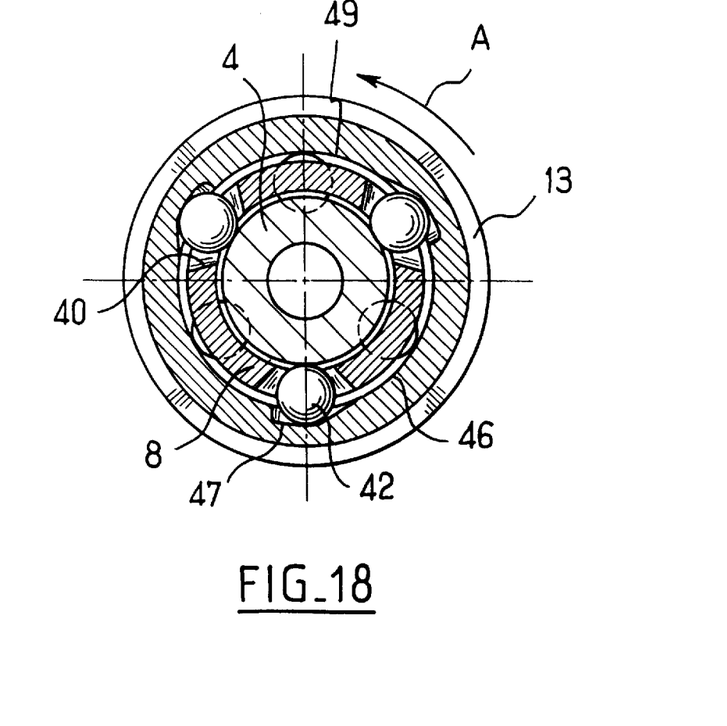

With reference to FIGS. 16 to 18, the second recesses 47 then extend in register with the slots 40. The male endpiece 2 can then be withdrawn backwards so that the conical wall 4.2 constitutes a ramp bringing the balls 42 into their retracted position within the second recesses 47.

Once the annular collar 4 has gone past, the operator releases the thimble 13 which returns to its first position under drive from the spring blades 32. The balls then return into the first recesses 46 via the sloping walls 48 so as to occupy the projecting positions in which they are held by the end walls of the first recesses 46.

Naturally, the invention is not limited to the embodiments described, and it is possible to make variants thereof without going beyond the ambit of the invention as defined by the claims.

In particular, the third position of the sleeve 13 could be offset from the other two positions in an axial direction.

What is claimed is:

1. A ball coupling having a longitudinal axis (1) and comprising a male tubular endpiece (2) provided with an outer annular collar (4), a female tubular endpiece (3) on which there is fixed coaxially one end (7) of a tubular sleeve (6) which extends beyond the female endpiece and which has first slots (10) for forming a ball-holding cage to hold locking balls (12) for locking the male endpiece in a coupled state inside the female endpiece, and a thimble (13) mounted coaxially around the sleeve (6) via guide means (15) enabling the thimble to be guided in rotation about the longitudinal axis of the coupling so as to enable it to turn through a turn angle (α) between a first position and a second position, the thimble comprising, for each locking ball, a first recess (16) extending in register with the corresponding first slot for the first position of the thimble so as to form an abutment that holds the corresponding ball in a position in which it projects into the inside of the sleeve (6) so as to define a passage of section (s) that is smaller than the section (s') of the outer annular collar (4), and a second recess (17) connected to the first recess by a sloping wall (18) and offset relative to the first recess by an angle (α) corresponding to the turn angle so as to receive the locking ball in a position in which it is retracted from its projecting position so as to define a passage of section not less than that of the outer annular collar, wherein the first slots (10) are elongate and extend parallel to the longitudinal axis (1) of the coupling, wherein each first recess (16) extends in register with a portion of the first slot (10) adjacent to the free end (9) of the sleeve, wherein the thimble has an additional annular recess (19) connected via a sloping wall (20) to the first recesses (16) so as to extend in register with the portions of the first slots (10) that extend adjacent to the fixed end (7) of the sleeve (6) so as to receive the locking balls (12) in the retracted position, and wherein a ring (21) is mounted in the additional recess (19) to slide between a disengaged position in which it disengages the additonal recess and an obstruction position in which it obstructs the additional recess, into which position the ring is urged resiliently so as to push the locking balls (12) into the first recesses.

2. A ball coupling according to claim 1, comprising a helical spring (24) interposed between the ring (21) and the sleeve (6) to urge the ring resiliently towards its obstruction position.

3. A ball coupling according to claim 1, including a valve member (28) mounted in the female endpiece (3) to move between a closed position in which it closes the female endpiece, into which position it is urged resiliently, and an open position into which it is moved by the male endpiece (2) when the male endpiece is coupled to the female endpiece, wherein the sleeve (6) has run slots (40) for forming a ball-holding cage for holding retaining balls (42) for retaining the male endpiece (2) in a disengaged position relative to the female endpiece (3), the retaining balls (42) being axially offset towards the free end of the sleeve (6) relative to the locking balls (12), the thimble (13) being mounted on the sleeve so as to be movable into a third position and having internal means for receiving the retaining balls (42) such that said returning balls are in a position in which they project into the inside of the sleeve so as to define a passage of section that is smaller than that of the outer annular collar (4) at least when the thimble is in its second position, and such that the retaining balls are in a retracted position relative to their projecting position so as to define a passage not less than that of the annular collar when the thimble is in its third position, and wherein the coupling has means for connecting the male endpiece to an exhaust when it is in its disengaged position.

4. A ball coupling according to claim 3, wherein the thimble (13) is mounted on the sleeve (6) to move into its third position which is angularly offset relative to its second position by turning, wherein the means for housing the retaining balls (42) comprise, for each retaining ball, a first recess (46) extending in register with the corresponding second slot (40) at least when the thimble (13) is in its second position so as to form an abutment for holding the retaining ball in its projecting position, and a second recess (47) connected to the first recess by a sloping wall (48) and offset from the first recess by an angle (α) corresponding to the turn angle so as to receive the retaining ball in its retracted position when the thimble is in its third position.

5. A ball coupling according to claim 4, wherein the first position of the thimble is situated between its second and third positions, and wherein the thimble is urged resiliently towards its first position.

6. A ball coupling according to claim 4, wherein the first and second recesses (46, 47) of the means for housing the retaining balls (42) open out at the end of the thimble (13) adjacent to the free end (9) of the sleeve (6) so as to form a portion of the means for connecting the male endpiece (2) when in its disengaged position to the exhaust.

7. A ball coupling according to claim 4, wherein, when the thimble (13) is in its first position, a portion of each first recess (16) for housing a locking ball (12) and a portion of each first recess (46) for housing a retaining ball (42) extend in register with a second slot (40) associated with the corresponding retaining ball (42) and are in communication with each other.

* * * * *